(12) United States Patent
Ferrin (10) Patent No.: US 10,187,214 B2
(45) Date of Patent: *Jan. 22, 2019

(54) METHOD AND APPARATUS FOR THE LIMITATION OF THE MINING OF BLOCKS ON A BLOCK CHAIN

(71) Applicant: Daniel Robert Ferrin, Superior, CO (US)

(72) Inventor: Daniel Robert Ferrin, Superior, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 15/922,556

(22) Filed: Mar. 15, 2018

(65) Prior Publication Data

US 2018/0205558 A1 Jul. 19, 2018

Related U.S. Application Data

(62) Division of application No. 14/987,842, filed on Jan. 5, 2016, now Pat. No. 9,973,341.

(60) Provisional application No. 62/107,226, filed on Jan. 23, 2015.

(51) Int. Cl.
*H04L 9/32* (2006.01)
*G09C 1/00* (2006.01)

(52) U.S. Cl.
CPC ............ *H04L 9/3247* (2013.01); *G09C 1/00* (2013.01); *H04L 9/3236* (2013.01); *H04L 2209/38* (2013.01)

(58) Field of Classification Search
CPC .............................. H04L 2209/38; G09C 1/00
USPC ........................................................ 713/176
See application file for complete search history.

(56) References Cited

U.S. PATENT DOCUMENTS

| 9,722,790 | B2* | 8/2017 | Ebrahimi | .............. H04L 9/3066 |
| 2004/0117616 | A1* | 6/2004 | Silvester | ............... G06F 21/445 |
| | | | | 713/155 |
| 2008/0222415 | A1 | 9/2008 | Munger | |
| 2015/0033301 | A1 | 1/2015 | Pianese | |
| 2016/0098723 | A1 | 4/2016 | Feeney | |
| 2018/0152304 | A1* | 5/2018 | Ebrahimi | .............. H04L 9/3236 |
| 2018/0254905 | A1* | 9/2018 | Chun | ........................ H04L 9/06 |

OTHER PUBLICATIONS

L.M Goodman, Tezos: A Self-Amending Crypto-Ledger Position Paper, Aug. 3, 2014, downloadable from: https://www.tezos.com/static/papers/position_paper.pdf, 18 pages.

(Continued)

*Primary Examiner* — Jahangir Kabir
(74) *Attorney, Agent, or Firm* — Stanley J. Gradisar Attorney At Law, LLC; Stanley J. Gradisar (57) ABSTRACT

Systems, methods, and apparatuses are described wherein a block chain or block chain network can be created and the mining of new blocks can be limited to certain actors holding a specific set of private keys and verified by the corresponding public keys accessible to consumers interested in validating the block chain. These keys are stored in software or on specific hardware devices designed to not reveal the private key. Only blocks mined using those keys are acceptable on the block chain. The signing of the blocks in the particular block chain is integrated in such a fashion as to be integral to the proof of work for the block chain.

4 Claims, 3 Drawing Sheets

(56) References Cited

OTHER PUBLICATIONS

U.S. Appl. No. 14/987,842, filed Jan. 5, 2016 Office Action Non-Final dated Jun. 9, 2017, Jahangir Kabir; 20 pages.
U.S. Appl. No. 14/987,842, filed Jan. 5, 2016 Office Action Final dated Nov. 3, 2017, Jahangir Kabir; 18 pages.
U.S. Appl. No. 14/987,842, filed Jan. 5, 2016 Advisory Action, AFCP 2.0 Decision, Examiner Initiated Interview Summary, dated Jan. 18, 2018, Jahangir Kabir; 10 pages.
U.S. Appl. No. 14/987,842, filed Jan. 5, 2016 Notice of Allowance dated Mar. 2, 2018, Jahangir Kabir; 18 pages.

* cited by examiner

METHOD AND APPARATUS FOR THE LIMITATION OF THE MINING OF BLOCKS ON A BLOCK CHAIN

CROSS-REFERENCES TO RELATED APPLICATIONS

This application is a divisional application of application Ser. No. 14/987,842 filed on Jan. 5, 2016 titled "Method And Apparatus For The Limitation Of The Creation Of Blocks On A Block Chain" which is incorporated herein by reference in its entirety for all that is taught and disclosed therein. This application also claims the benefit of U.S. Provisional Application Ser. No. 62/107,226 filed on Jan. 23, 2015 Titled "Method And Apparatus For The Limitation Of The Creation Of Blocks On A Block Chain" which is incorporated herein by reference in its entirety for all that is taught and disclosed therein.

BACKGROUND

The field of invention is block chain technology, and specifically in the area of mining algorithms and mining devices. Bitcoin and Cryptocurrencies that derived from it are based on a unique combination of a proof of work block chain, a peer-to-peer network, and a cryptographically validated ledger. This invention is an improvement on the proof of work block chain portion of the prior art. This improvement also enables some features in the other two components.

Block Chains and Mining

For the purpose of this invention a proof of work block chain is a data structure consisting of a series of "blocks" that are progressively derived from the previous block in the chain or a specific 'genesis block.' The process of mining is the discovery and assembly of these new blocks. First information from the peer-to-peer network a miner is connected to is retrieved and the preliminary data in the block is calculated. Next some other data fields are searched via a 'brute force' method to find a set of values that makes the block as a whole pass a fitness function. This fitness function is designed to keep the level of computational effort needed to discover an acceptable block high while the effort needed to verify the data values are acceptably mined low. This brute force process is sometimes referred to as the "puzzle," "computational puzzle," or "client puzzle" in academic literature, or as "hashing" or "mining" in practitioner literature.

Each block of a block chain contains data that conforms to one of three characterizations. The first data characterization is a reference to previous data in the block chain. The second characterization is data that is payload and bookkeeping data values. The final data characterization is nonce data. The reference to previous data is typically a cryptographic hash of the block just prior to the current block. The payload and bookkeeping values vary based on the specific block chain, but include values such as the hash of the current ledger entries, the time the block was generated as reported by the miner, and factors influencing the application of the fitness function. The nonce is a data value that is present principally to impact the fitness function and to insure each block is unique. Typical implementations of the nonce is derived from a process described in the field as "mining." The nonce of a block is an unrelated data field that is progressively altered by the miners until the application of a fitness function determine that the block is acceptable for use as a previous block. Typical nonce update strategies are incrementing/decrementing the nonce value by a fixed amount, a deterministic walk of the range of the nonce values controlled by some function, and a random change of the nonce value. Once an acceptable value is found the block being mined is broadcast to the other members of the peer-to-peer network and generally the miners begin the creation of a new block. There are typically multiple nonce values that cause the block to be found fit by the fitness function, but the ratio of acceptable to unacceptable values is very high, from millions to billions to octillions or more. The effort to find these rare acceptable values serves as the "proof of work."

For the original bitcoin block chain, the fitness function is to calculate the SHA256 hash of the block, convert the hash to an integer number, and then compare the number to another number kept in the bookkeeping data in the block header. If the converted hash value is less than the converted difficulty value then the block is acceptable. Higher difficulty required that a smaller converted hash value be found. The easiest possible hash for the easiest possible difficulty occurred in approximately one in $2^{32}$ hashes (over 4 billion). Modern difficulties can require more than $2^{64}$ hashes, or over 16 quintillion calculations (16,000,000,000,000,000,000). There fitness function for bitcoin also included a regularly occurring recalculation of the difficulty to ensure that a block was found, on average, every 10 minutes. This value makes up part of the bookkeeping data.

After a while "altcoins" emerged. These are other block chains that are usually derived from bitcoin code and protocols. Some altcoins changed this fitness function while others would alter the parameters of the difficulty adjustment or the frequency of block generation. One way the fitness function would be altered would be to replace the hashing function with other hashing functions like Scrypt, Blake, SHA3, and in some instances multiple functions. In some cases, the stated goal for altering the fitness function would make developing custom hardware to mine the block chain very difficult. Some altcoins moved their fitness function away from a hash calculation and replaced it with a fitness function that integrated the peer-to-peer network and cryptographic ledger to form a "proof of stake" system where the computers that controlled certain sums of their altcoin would be responsible for creating the blocks on the block chains. The proof of stake systems require participation in the ledger system. In other words, everyone mining in the system must have control over some of the currency in the system and thus a "stake" or interest in the viability of the payload.

The content of the block chain has also evolved over time. Bitcoin was designed to be a distributed ledger of tokens denominated in the eponymous units of bitcoin. These tokens have been used as a digital replacement for cash and currency in many instances. The block chain was used as a settlement mechanism to fight against "double spend" attacks and other such fraud attempts against the cryptographic ledger that the peer-to-peer network was distributing.

The mining process simultaneously protected the ledger via proof of work (as described later) as well as served as the creation mechanism for the bitcoin currency tokens. According to the validation rules the first transaction in a block is a special transaction that can output up to a fixed amount of bitcoins based on a predetermined schedule and the amount of unspent bitcoins in the transactions referenced in the block. The miner for that block is responsible for generating that special transaction and determines where the output bitcoin tokens go. Typically, they will provide an address representing themselves or the other entities mining this block. Some miners will sell those tokens to pay for the expenses related to mining.

Much like altcoins the payload of these block chains have evolved from a cryptographic ledger to include more complex items. Some consumers encode data representing other tokens into their ledger transactions or other completely unrelated data, such as poems and pictures. Some other block chains allow for more complex entries such as multi-token ledgers, "proof of existence" hashes, computer code, and smart contracts.

The ultimate incentive in mining is to decide what content is placed into the payload. So long as the content of the payload conforms to the rules established by each block chain each miner has wide discretion to decide what does and does not get included in each block that they mine.

Purpose of Proof of Work in a Block Chain

The original purpose of proof of work, as used in Hashcash (Back, A., Hashcash), is to require some minimal expenditure of computational power on the part of a sender in order for a mail recipient to consider an email message to not be junk. By applying an increased level of effort, it was hoped that junk mail senders could not send millions of duplicate emails because they either lack the computation resources to calculate the millions of hashes or the cost of electricity and hardware maintenance would make the effort of spam to become economically infeasible.

The block chain as used by bitcoin, however, uses the proof of work as an anti-fraud measure to prevent the historical ledger from being re-written by malicious parties. In order to re-write a ledger entry at some point in the block chain's history you would also need to re-calculate the hashes and nonces of all blocks that were generated after the block was added to the block chain. The older the entry, the more blocks there are that would need to be re-mined. This is where the proof of work is valuable. Bitcoin also makes this proof of work more difficult by distributing the proof of work effort across a peer-to-peer network. Rather than each node working on separate block chains there is (ideally) one block chain being calculated across the entire network. So, the net power of the whole peer-to-peer network is focusing on creating the next block to follow what is considered to be the current best block.

Since the creation of a previous block used what is assumed to be all of the computational power available to the peer-to-peer network then if you could redirect all of the hashing power used to create it you would need approximately the same amount of time to re-write history for that block as it took to generate the block in the first place. And to change one block you would also, by necessity, need to regenerate all blocks that followed it so it would be the best block. So, to rewrite a ledger entry that was part of a block that has since had 10 hours of blocks generated after it, then it would take approximately 10 hours to regenerate just the blocks that have been added on to the block chain it came from, assuming you could re-direct all the computational power to the generation. So, if computational power were kept constant and control of hashing power were not considered, the anti-fraud nature of the block chain derives from the characteristic that rewriting history takes just as long to do as generating the history in the first place.

The computational power does not stay constant on the block and redirecting the entire network to re-write history is nearly impossible because the bitcoin protocol incentivizes individual miners to work on the current longest chain for personal profit. The incentive structure is designed to inhibit the malicious rewriting of history when all miners are "honest." It would take the cooperation of about half of the computational power on the peer-to-peer network to allow rewriting of even the most current block, and thus destabilize the history of the block chain. In literature this is referred to as a "51% attack." This incentive has resulted in a diverse set of competing miners across many legal jurisdictions.

The amount of mining occurring on any block chain is also highly variable, and almost always increasing for any viable block chains. The rules for the payload and the bookkeeping are generally known so that can be easily verified, and from that information new blocks can be generated by anyone with enough computational power. And computational power can continually be being created and added to the peer-to-peer network. This is considered by the community to be a feature of the protocol, not a problem.

However, if a miner kept enough "dark" computational power (not generally know to the network because it isn't reporting mined blocks) that was in excess of the computational power of the existing network it could run a "time warp" attack where large portions of the ledger history is re-written. Because of the incentive structure of most block chains this would tend to destabilize the block chains it was run against once these time-warped blocks are propagated across the network. The fungible nature of some of these fitness functions is why it is possible for large amounts of computational power to be used in these attacks if one were to spend enough energy and resources on computing equipment.

SUMMARY

This Summary is provided to introduce in a simplified form a selection of concepts that are further described below in the Detailed Description. This Summary is not intended to identify key or essential features of the claimed subject matter, nor is it intended to be used to limit the scope of the claimed subject matter.

As used herein, "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B, and C together. When each one of A, B, and C in the above expressions refers to an element, such as X, Y, and Z, or class of elements, such as X1-Xm, Y1-Yn, and Z1-Zo, the phrase is intended to refer to a single element selected from X, Y, and Z, a combination of elements selected from the same class (e.g., X1 and X2) as well as a combination of elements selected from two or more classes (e.g., Y1 and Z3).

It is to be noted that the term "a entity" or "an entity" refers to one or more of that entity. As such, the terms "a" (or "an"), "one or more," and "at least one" can be used interchangeably herein. It is also to be noted that the terms "comprising," "including," and "having" can be used interchangeably.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof, shall include all those described in the summary of the invention, brief description of the drawings, detailed description, abstract, and claims themselves.

The term "bitcoin" means the methods and apparatuses described in the 2008 paper by Satoshi Nakamoto titled "Bitcoin: A Peer-to-Peer Electronic Cash System" and the software system whose source code is found at https://github.com/bitcoin/bitcoin.

The term "bookkeeping device" means an apparatus such as a general-purpose computer that is responsible for communicating with the block chain network and assembles and prepares a block for the signing device. When a block is found to be valid it is also the device that broadcasts the block to the block chain network.

The term "cleartext" means data that is either computer or human readable that has not been subjected to encryption to obscure its contents or meaning.

The term "cryptocurrencies" means a digital currency in which encryption techniques are used to regulate the generation of units of currency and verify the transfer of funds. Many cryptocurrencies include the use of a block chain to provide security and prevent fraud such as double spending. Some cryptocurrencies have alternate mechanisms other than a block chain to provide the same security.

The term "fitness function" means a process or method where the measurements and calculations related to a specific block are evaluated and the function determines if a block is suitable to be added to the block chain taking into account the desired rate of block discovery and growth of the block chain. To be effective it should be computationally infeasible to invert a fitness function, i.e., the function needs to be one-way in practical terms. One example would be to calculate a secure cryptographic hash of a block, convert that hash to an integer value, and then compare that integer value to a range of acceptable integer values. The range of acceptable values would be encoded in the bookkeeping data of the block. A good fitness function should also be tunable so that the frequency of acceptable and unacceptable blocks can be adjusted as needed. It is not a requirement that a fitness function be tunable and one-way, but it is preferable.

The term "genesis block" means a block in a block chain for which there is no prior block. This block is used to initiate the chain and does not point to a previous block. There should only be one genesis block in a single parent chain.

The term "hashing device" means a device that typically contains specialized circuitry or software that is responsible for repeatedly adjusting the nonce and sometimes bookkeeping portions of a block and completing the hashing calculations for the block it has been provided by its bookkeeping device. This device provides blocks to the bookkeeping device that meet the standards of the fitness function of the entire block chain or of a different fitness function relevant to it and the bookkeeping device.

The term "nonce" means a piece of data in a block that is principally used to influence the measurement and calculations of the block prior to the evaluation by the fitness function. Often the data has no bearing on the bookkeeping or payload portions of a block, although changes in the bookkeeping and payload portions of the block will similarly impact the measurement and calculations.

The term "payload" means the data that is transmitted with the block chain that the consumers of the block chain are interested in recording and reading. This data is not typically stored in the block header but instead a hash of the contents is stored in the block header. The payload data not stored in the block header, bookkeeping data not stored in the block header, and the block header itself constitute a block that is part of a block chain. Typical payload content includes ledger entries, documents, computer code, and the results of the evaluation of computer code stored as payload.

The term "public/private key pair" means the data for the related public and private cryptographic keys used in public-key cryptography, in particular those used for private key signing and public key verification of digital signatures.

The term "signing device" means a hashing device that also holds the private portion of a public/private key pair and uses that information to digitally sign the block. The block signing process sometimes uses other data including but not limited to the block itself and the corresponding public key. This device may or may not perform the measurements and calculations related to the fitness function, and it may return all signed blocks or it may only return selected blocks to the bookkeeping device.

The term "strict" means, when referring to the ordering of steps, that the sequence of the execution of the steps must be maintained. Other inconsequential steps may be inserted between the steps or removed, but the information that results from the prior step is needed to begin the following step. Hence parallel execution of the step is also not allowed. When the ordering is not strict then the sequential ordering of the steps can be altered and the steps can also be performed in parallel one to the other. This is because the information that results from any of the steps where ordering is not strict is not needed to begin any of the steps where ordering is not strict.

The Problem of Unbound Computation

None of these systems provided a means where hashing could be limited to a known and controllable set of computing devices, possibly as few as one. The design intent of these systems is that anyone with the proper software could participate in the mining portion with any device they could make work. Thus, large amounts of hashing power could uncontrollably be brought to bear against any particular block chain and the only defense against 51% attacks and time warp attacks was for the community to provide more hashing power than a bad actor could marshal. In some cases, more than 200% more power than a bad actor could marshal is needed.

It is because of this that current bitcoin derived block chains are only suitable for chains of general interest rather than smaller niche interests. If one small community is maintaining a block chain and they had limited computational power then a larger external community with compatible computational capability but more computational power could take the niche block chain and maliciously re-write the history of the niche communities block chain and the smaller community would need to resort to off-block chain techniques to preserve its smaller chain. But those techniques will remove the fraud resistant characteristics of the block chain, often by introducing trust in a block chain referee (such as a developer of the software) to designate certain blocks as on the approved chain of hashes. And the techniques to validate the trust could invalidate the proof of work.

Further compounding this problem is that there are neither mechanisms nor means within current block chain systems to limit what computing devices are eligible to calculate new blocks in a block chain without requiring participation in whatever currency or payload is protected by that block chain. Hence it is impossible to reliably calculate the total computational effort available in the past, present, or future but only to estimate how much hashing power was actually used in the past to generate the present block chain. It is also thus impossible to control with certainty who is adding or updating conforming bookkeeping and payload values on the block and to verify that those calculations were made when the block was generated.

Solution to Problem

This invention provides a method and apparatus that is a solution to the technical problem of providing a proof of work mining system where the process of mining can be limited to miners who hold both halves of an asymmetric cryptographic key, and incorporating the use of those keys into the payload, bookkeeping, and/or nonce parts of a block. The consumers of the block chain can still validate the security of the chain with one half of the asymmetric cryptographic key, but they cannot add to the block chain because they do not have the other half of the asymmetric cryptographic key. Preferred embodiments of the invention store the full key in such a fashion that binds the private part of the key to some piece of hardware that will not divulge the private key, and that piece of hardware is responsible for the generation of the digital signatures. Other embodiments would protect the private key with software or would provide no protection of the dissemination of the private key.

By limiting valid block chains to those generated using specific key pairs and calculating the amount of mining work that can be performed by those holding the keys, an upper limit of the maximum available computational power can be established as part of the chain, and "dark net" hashing attacks can be nearly eliminated.

First, the method of mining is altered by adding an extra step between the updating of the nonce and the calculation of the hash. In this step a digital signature is calculated from the contents of the block created up to that point, and that signature is added to the block header directly or as part of bookkeeping or payload data. The hash of the block is then calculated from either the digital signature alone or from the block (in whole or in part) which will include the digital signature. Some digital signature algorithms such as ECDSA produce non-deterministic digital signatures. In those cases, the signature also serves as a nonce and such signature algorithms are considered "self noncing." In these situations, the step where the nonce is updated may be subsumed into the block signing step (although it is not a requirement). In the preferred embodiment there are no nonces or other data items added to the block after the signature of the other items of the block prior to the calculation of the hash of the block and evaluation by the fitness function.

The public key used to sign that particular block is then used to verify the validity of the block, and a block that does not have a valid digital signature is invalid according to the protocol and will not be propagated or used by conforming miners and consumers. In one embodiment the valid key or keys are communicated and maintained "out of band" from the block, such as through configuration files used by the mining software or appropriate miner or consumer software. In another embodiment the information to determine the valid keys for a block are embedded in the blocks themselves as bookkeeping data. In another embodiment the information to determine the valid keys for a block are carried in the payload data of the block. In another embodiment the keys are communicated via some combination of the preceding methods.

By virtue of this method, an apparatus can be constructed wherein the ability to create a block can be tied to a specific apparatus or series of apparatuses. This is accomplished by securely storing the private key on the apparatus in a manner where the private key is not or cannot be exposed to any other miners or mining devices. One means would be to use a general-purpose computer and implement a series of information control mechanism so that the private key is never exposed. Another means would be to use a processor with a secure hardware mode such as a Trusted Execution Environment (such as on a typical Android Smartphone circa 2015) (see U.S. Pat. No. 7,210,009). Another means would be to attach a device to the general-purpose computer that would store the private key and perform the signing functions, such as a smart card reader or a secure element. Another means would be to access the secure key and signing process via a network connected device to some device responsible for the security of the key, such as a network connected Hardware Security Module. Standard protocols and APIs such as PKCS11 may be used to accomplish any of these mechanisms, or custom protocols or APIs may be developed, or some combination of the two.

In one embodiment the private keys are permanently bonded to the device that generates the digital signature, and this device is dedicated solely to generating these digital signatures, and the maximum amount of signatures that these devices can create in a given time frame is within a fixed range. This is also known as the hashing power. Other embodiments may not bind the keys to one piece of hardware. In this configuration the signing process is less secure and undesirable because the hashing power may be increased. Another embodiment has the hashing power bonded to a single device, but the hashing power varies over time because of factors such as other tasks the device may be asked to perform or the amount of electrical power available to the chip (such as whether the device is on battery mode or if the device is attached to external power). Such variations in the hashing power reduce the certainty of the hashing power. However, with proper key handling the ability to eliminate "dark pool" mining power is still preserved.

When the sum of the hashing power of all validated signers on the block chain is known an upper limit on the hashing power can be calculated and used in risk calculations for the level of security on the block chain. This is in direct contrast to current block chains where the unsigned hashing allows for anyone to theoretically create more hashing power than the current miners of the chain are aware of. This "dark pool" is totally unknown and can be conducted in private before being revealed. When an enumerated list of miners is known such dark pool attacks can be calculated from the list of miners not contributing blocks, or it can be detected from a sudden increase in the number of valid block signers.

Thus, this invention creates a method and an apparatus for that method where a proof of work block chain network can be created, and the methods of adding new blocks on this block chain can be limited in size. This invention also creates a means where such limitation can be fully quantified and relied upon, eliminating the risks and expenses of unbound computations and unpredictable dark net attacks on the proof of work in the block chain.

To assist in the understanding of the present disclosure the following list of components and associated numbering found in the drawings is provided herein:

Table of Components

| Component | # |
|---|---|
| "Find Previous Block" Step | 102 |
| "Calculate Payload" Step | 104 |
| "Update Bookkeeping" Step | 106 |
| "Update Nonce" Step | 108 |
| "Hash Block" Step | 110 |
| "Hash Rare Enough?" Step | 112 |
| "Broadcast Block" Step | 114 |
| "Find Previous Block" Step | 202 |
| "Calculate Payload" Step | 204 |
| "Update Bookkeeping" Step | 206 |
| "Update Nonce" Step | 208 |
| "Sign Block" Step | 209 |
| "Hash Block" Step | 210 |
| "Hash Rare Enough?" Step | 212 |
| "Broadcast Block" Step | 214 |
| "Find Previous Block" Step | 302 |
| "Calculate Payload" Step | 304 |
| "Update Bookkeeping" Step | 306 |
| "Sign Block" Step | 309 |
| "Hash Block" Step | 310 |
| "Hash Rare Enough?" Step | 312 |
| "Broadcast Block" Step | 314 |
| Signing Device | 416 |
| Communication Channel | 417 |
| Bookkeeping Device | 418 |
| Communication Channel | 419 |
| Block Chain Network | 420 |
| Signing Devices | 516 |
| Communication Channels | 517 |
| Bookkeeping Device | 518 |
| Communication Channel | 519 |
| Block Chain Network | 520 |
| Signing Devices | 616 |
| Communication Channels | 617 |
| Bookkeeping Devices | 618 |
| Communication Channels | 619 |
| Block Chain Network | 620 |
| Signing Devices | 716 |
| Communication Channels | 717 |
| Bookkeeping Device | 718 |
| Communication Channel | 719 |
| Block Chain Network | 720 |
| Displays | 721 |
| Bookkeeping Device/Block Chain Consumer | 722 |
| Block Chain Consumer | 723 |

DETAILED DESCRIPTION

The invention may be implemented as a computer, a computing system, or as an article of manufacture such as a computer program product. The computer program product may be a computer storage medium readable by a computer system and encoding a computer program of instructions for executing a computer process.

The invention may also be practiced as a method, or more specifically as a method of operating a computer system. Such a system would include appropriate program means for executing the method of the invention.

Also, an article of manufacture, such as a pre-recorded disk or other similar computer program product, for use with a data processing system, could include a storage medium and program means recorded thereon for directing the data processing system to facilitate the practice of the method of the invention. It will be understood that such apparatus and articles of manufacture also fall within the spirit and scope of the invention.

With the computing environment in mind, embodiments of the present invention are described with reference to logical operations being performed to implement processes embodying various embodiments of the present invention. These logical operations are implemented (1) as a sequence of computer implemented steps or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts, applications, or modules. It will be recognized by one skilled in the art that these operations, structural devices, acts, applications, and modules may be implemented in software, firmware, special purpose digital logic, and any combination thereof without deviating from the spirit and scope of the present invention as recited within the claims attached hereto.

Figure 1:
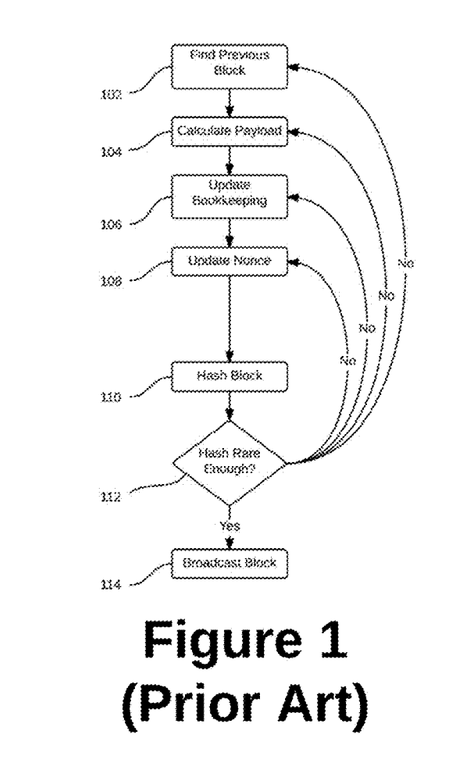
FIG. 1 shows a flow chart of the process the prior art uses to generate a block to be added to the block chain.

Referring now to the Figures, like reference numerals and names refer to structurally and/or functionally similar elements thereof, and if objects depicted in the figures that are covered by another object, as well as the tag line for the element number thereto, may be shown in dashed lines. FIG. 1 shows is a logical flowchart of the current method of mining blocks for bitcoin and most bitcoin derived block chains and represents prior art. Each step may be performed on a different device and a single device may perform multiple steps. Referring now to FIG. 1, in "Find Previous Block" Step 102 the bookkeeping device consults its store of blocks as well as other bookkeeping devices on the block chain network to determine what the current "tip" of the block chain is. For the original bitcoin network this is the block with the most proof of work (by block count and difficulty, referred to as block height or longest chain) and when multiple blocks with the same level of proof of work then the block that was seen first. This previous block may be a "genesis block" if no other blocks exist. The hash identifying the block is used as a reference.

"Calculate Payload" Step 104 involves the bookkeeping device to determine what payload to place into the new block it is generating. The contents of the payload vary by block chain but in the case of bitcoin it is a Merkle Tree of the transactions to be broadcast with this block. The payload is then reduced to one or more one-way hashes and stored in the block as those hashes. There can be some complex rules relating to the generation of the payload of which most are not detailed in this invention but is well known in the art.

"Update Bookkeeping" Step 106 involves the bookkeeping device updating the bookkeeping fields that are stored in the new block. In bitcoin these include the version of the block header used, the local time as reported by the bookkeeping device, and the difficulty of the proof of work for this block.

In "Update Nonce" Step 108 the nonce value is changed by the bookkeeping device or a separate mining device. Some miners increment it, some other miners use a deterministic walk of the range, and others randomly change it to a new number. How the nonce is changed is not generally relevant to this invention.

In "Hash Block" Step 110 the contents of the block header are hashed by either the bookkeeping device or (more commonly) a separate hashing device. In bitcoin this involves running the SHA-256 hashing algorithm against the binary representation of the new block generated by the previous steps in the algorithm.

"Hash Rare Enough?" Step 112 is where the hash calculated in Step 110 is compared to the bookkeeping rules stored in Step 106 and the fitness function is applied. If the hash of the block satisfies the fitness function then it goes on to "Broadcast Block" Step 114.

If "Hash Rare Enough?" Step 112 determines that the hash is not rare enough, then the algorithm goes back to a previous step in the mining process depending upon the state of the block chain network. If a new valid block has been found and broadcast, then the algorithm goes back to "Find Previous Block" Step 102. If the bookkeeping device wants to include new payload then the algorithm goes back to "Calculate Payload" Step 104. If bookkeeping information has changed (for example the current system time has changed or the block difficulty has adjusted) then the algorithm goes back to "Update Bookkeeping" Step 106. Otherwise the algorithm goes back to "Update Nonce" Step 108.

"Broadcast Block" Step 114 is the final step. The calculated block is added to the bookkeeping device's store of known blocks. The block is broadcast to the block chain network for other bookkeeping devices to add to their store of known blocks.

After "Broadcast Block" Step 114 the process of mining a block is complete. Most bookkeeping devices would then return to "Find Previous Block" Step 102 and calculate a new block. However, that is not required.

It should be noted that the ordering of the "Find Previous Block" Step 102, "Calculate Payload" Step 104, "Update Bookkeeping" Step 106, and "Update Nonce" Step 108 are not strict. They may be performed out of order or even in parallel. Hence the Step that is arrived at as a part of "Hash Rare Enough?" Step 112 may also vary based on the ordering of these Steps. It should be noted that in the case the hash is not rare enough in Step 112 that only some of the previous Steps may be performed prior to attempting to calculate again if the hash is rare enough.

The ordering of the "Hash Block" Step 110 relative to the four previous Steps (and in particular "Update Nonce" Step 110), and "Hash Rare Enough?" Step 112 relative to "Hash Block" Step 110 is strict.

Even though the flowchart states "Hash Block" Step 110 and "Hash Rare Enough?" Step 112, it should be noted that the fitness function may take forms other than the evaluation of an integer conversion of the cryptographic hash of the block header. In those cases, "Hash Block" Step 110 serves as the Step where calculations and measurements are made based on the block being generated, and the "Hash Rare Enough?" Step 112 consists of the consideration of those measurements to see if the ratio of acceptable to unacceptable blocks is preserved.

Figure 2:
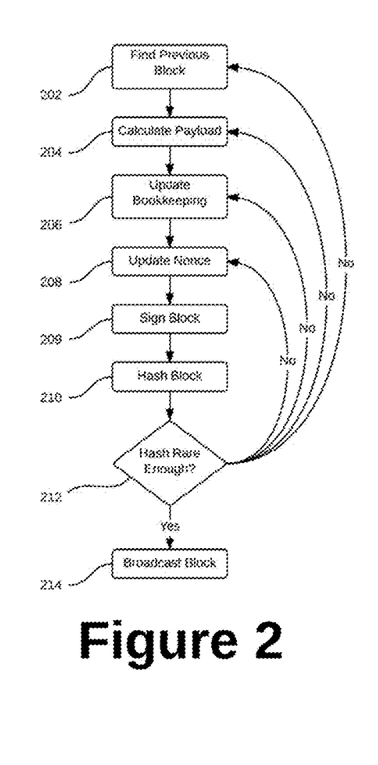
FIG. 2 shows a flow chart of the process for generating a block to be added to a block chain wherein the process is improved by adding a step to digitally sign the block.

FIG. 2 shows a logical flowchart of the method of mining described in this invention. It is an improvement on the method described in FIG. 1.

"Find Previous Block" Step 202 is the same or substantially similar to the Step described in FIG. 1 of the same name.

"Calculate Payload" Step 204 is the same or substantially similar to the Step described in FIG. 1 of the same name. In one embodiment of this invention this is also where the list of public keys allowed to sign blocks and their permissions is added to the payload. The public key of the key pair used to sign this block may also be stored in the payload.

"Update Bookkeeping" Step 206 is the same or substantially similar to the Step described in FIG. 1 of the same name. In one embodiment of this invention this is also where the list of public keys allowed to sign blocks and their permissions is added to the bookkeeping. The public key of the key pair used to sign this block may also be stored in the bookkeeping data.

"Update Nonce" Step 208 is the same or substantially similar to the Step described in FIG. 1 of the same name.

"Sign Block" Step 209 is where a digital signature is added to the block. The contents of the block calculated by the previous four Steps is signed by a public/private key pair. This step is performed on the network attached signing device, or devices attached to or that are an integral part of the bookkeeping device, or on the bookkeeping device itself. This Step is not seen in the method described in FIG. 1.

"Hash Block" Step 210 is where the identifying block hash is calculated. This is different from the method described in FIG. 1. In one embodiment of the invention the hash is calculated from the digital signature calculated in "Sign Block" Step 209. In another embodiment the signature is added to the data structure of the block and the hash is calculated from this modified block. The difference from the "Hash Block" Step 110 from FIG. 1 is that the results of the "Sign Block" Step 209, either in whole or in part, are considered in the measurements and calculations of the block.

"Hash Rare Enough?" Step 212 is the same or substantially similar to the Step described in FIG. 1 of the same name, including any decisions about what step to go to next.

"Broadcast Block" Step 114 is the final step and is the same or substantially similar to the Step described in FIG. 1 of the same name.

After "Broadcast Block" Step 114 the process of mining a block is complete. Most bookkeeping devices would then return to "Find Previous Block" Step 202 and calculate a new block. However, that is not required.

It should be noted that like in the process described in FIG. 1, the ordering of the "Find Previous Block" Step 202, "Calculate Payload" Step 204, "Update Bookkeeping" Step 206, and "Update Nonce" Step 208 are not strict. They may be performed out of order or even in parallel. Hence the Step that is arrived at as a part of "Hash Rare Enough?" Step 212 may also vary based on the ordering of these Steps.

In one embodiment of the invention the ordering of "Sign Block" Step 209 relative to "Find Previous Block" Step 202, "Calculate Payload" Step 204, "Update Bookkeeping" Step 206, and in particular "Update Nonce" Step 208 is strict. In the same embodiment the ordering of "Sign Block" Step 209, relative to "Hash Block" Step 210 and "Hash Rare Enough?" Step 212 is also strict.

In another embodiment of the invention "Sign Block" Step 209 may precede "Update Nonce" Step 208 and only sign the part of the block that does not include the nonce. However, the security gained by integrating the digital signature process into the proof of work process is lost. In fact, the block signing process in this embodiment could be subsumed into the "Update Bookkeeping" Step 206 to prove that the bookkeeper was the one providing the block header and not some third party. One embodiment of the invention could include both pre- and post-nonce signing for extra security on a networked environment.

Figure 3:
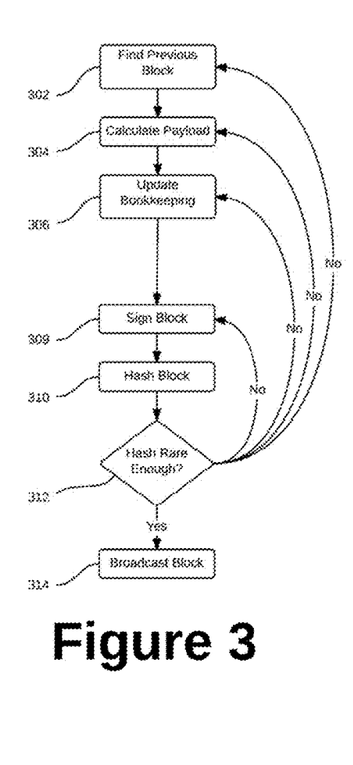
FIG. 3 shows a flow chart showing an alternative process of FIG. 2 when the digital signature algorithm produces a non-deterministic signature. This is an optional process in those cases.

FIG. 3 shows a logical flowchart of the method of mining described in this invention as an option when a non-deterministic digital signature algorithm such as ECDSA is used. Referring now to FIG. 3, when such an algorithm is used the Flowchart in FIG. 2 or FIG. 3 is acceptable. It is an improvement on the method described in FIG. 1, and is a variation of FIG. 2.

In this diagram the "Find Previous Block" Step 302, "Calculate Payload" Step 304, "Update Bookkeeping" Step 306, "Hash Block" Step 310, "Hash Rare Enough?" Step 312, and "Broadcast Block" Step 314 are the same as in FIG. 2.

The difference in FIG. 3 is that there is no "Update Nonce" Step. This is because of the non-deterministic nature of the digital signature algorithm being used, there are many valid digital signatures for the provided data. So, the "Sign Block" Step 309 performs both the functionality of the "Update Nonce" Step 208 and the "Sign Block" Step 209, as described in FIG. 2.

Also, since the "Update Nonce" Step is subsumed into the "Sign Block" Step 309, the process may go directly back to the "Sign Block" Step 309 after failing the "Hash Rare Enough?" step 312.

As in the case of FIG. 1 and FIG. 2 the relative ordering of some of the earlier steps is not absolute. Specifically, the "Find Previous Block" Step 302, "Calculate Payload" Step 304, and "Update Bookkeeping" Step 306 may be performed in any order, and in the case of the "Hash Rare Enough?" Step 312 failing its test, then zero, one, two, or three of these previous steps may be performed in any order. The ordering of "Sign Block" Step 309 is still strict in that it has to follow these three steps and must then be followed by the "Hash Rare Enough?" Step 312. Because a non-deterministic digital signature is considered "self noncing," the "Update Nonce" step would be performed as part of the "Sign Block" Step 309 if it was it called out separately.

Figure 4:
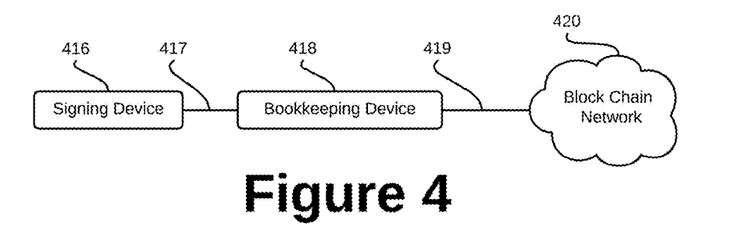
FIG. 4 shows a schematic diagram of a single bookkeeping device and single signing device servicing a block chain network.

FIG. 4 is a schematic diagram showing the configuration of a single aggregator and signer setup for a block chain network. Referring now to FIG. 4, the tasks of determining the contents of a block and signing the block are separated between two processing units, Signing Device 416 and Bookkeeping Device 418. In an alternate embodiment the processing units may be one and the same, but the figures treat them as separate for the purpose of illustration.

The unit labeled Signing Device 416 contains the data for one or more private and public key pairs needed to sign the block being generated. It is the location where the "Sign Block" Steps 209/309 is performed.

In one embodiment the private key never leaves Signing Device 416 and only exists on Signing Device 416. In another embodiment the key can be removed from Signing Device 416 in an encrypted backup or in cleartext. In all embodiments the public key can be exported from Signing Device 416 as part of the mined block or separate from the mined block.

In one embodiment Signing Device 416 is responsible for assessing the fitness of a particular block. In another embodiment Bookkeeping Device 418 is responsible for assessing the validity of a block.

The unit labeled Bookkeeping Device 418 is responsible for all of the other steps in the process of mining a block. It is not responsible for signing the block. In one embodiment it is responsible for determining the fitness of a block. In another embodiment it is not responsible for determining the fitness of a block because the Signing Device 416 is responsible for that. It is often a general-purpose computing device communicating with Signing Device 416. It also may represent several devices that work together to fulfill this function.

Communication Channel 417 between Signing Device 416 and Bookkeeping Device 418 can be a variety of mechanisms. In once embodiment Signing Device 416 is connected by Communication Channel 417 to the computer via a USB connection (or similar external connection) and Signing Device 416 appears as a USB device (or similar external device) to Bookkeeping Device 418. In another embodiment Signing Device 416 is integrated directly into the computing device and communicates by Communication Channel 417 with the CPU via the PCI bus or any other specific on-device connection. In another embodiment Signing Device 416 may be integrated directly into the CPU of Bookkeeping Device 418 by Communication Channel 417 via a means like a Trusted Execution Environment. In another embodiment Signing Device 416 and Bookkeeping Device 418 communicate by Communication Channel 417 via a computer network and Signing Device 416 could be other computing devices such as a general-purpose computer or a hardware security module. In another embodiment Signing Device 416 and Bookkeeping Device 418 are one and the same.

The Block Chain Network 420 represents the ultimate consumers of the generated blocks. In one embodiment it is a peer-to-peer network where Bookkeeping Device 418 is a peer on that network. In another embodiment Block Chain Network 420 could be a write only file collecting the ultimate output of the mining process. The exact construction of this network is not important to this invention.

Communication Channel 419 between Bookkeeping Device 418 and Block Chain Network 420 in one embodiment is a traditional internet connection to a peer-to-peer network sharing information about the blocks, items to be stored as payload, and additional information. In another embodiment Block Chain Network 420 is a storage device such as a hard disk and all information that would be announced to the block chain or read from the network would be written to or read from the disk. In this embodiment the announcement to the block chain network consists of writing the block to the disk. In another embodiment Block Chain Network 420 consists of a combination of these two embodiments. The specific Communication Channel 419 to the network is not important to this invention.

Figure 5:
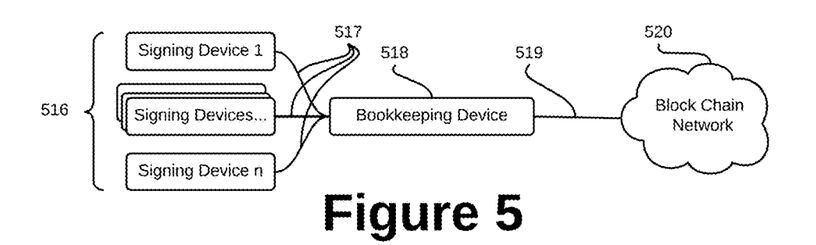
FIG. 5 shows a schematic diagram of a single bookkeeping device and multiple signing devices servicing a block chain network.

FIG. 5 is a schematic diagram of a single bookkeeping device communicating with multiple signing devices. Referring now to FIG. 5, it is principally the same as FIG. 4, with Signing Devices 516, Communication Channels 517, Bookkeeping Device 518, Communication Channel 519, and Block Chain Network 520 performing the same functions.

Signing Devices 516 are the same as the single Signing Device 416 in FIG. 4, and the possible Communication Channels 517 to Bookkeeping Device 518 are the same as in FIG. 4. In one embodiment each Signing Device 516 has a private and public key pair that is unique from the key pair that any other Signing Device 516 contains. In another embodiment the keys are not unique between each Signing Device 516, although they do not all necessarily need to share the same key.

In FIG. 5 Bookkeeping Device 518 is attached to multiple Signing Devices 516, and hence Bookkeeping Device 518 is responsible for ensuring that each Signing Device 516 is provided an appropriate amount of work.

If each Signing Device 516 has a unique key pair then whenever a Signing Device 516 is presented a block to sign that is otherwise identical to a block that another Signing Devices 516 is signing a different result block can be generated because the private keys differ. In another embodiment Signing Devices 516 may share a key, in that case Bookkeeping Device 518 is responsible for ensuring each Signing Device 516 has unique work to perform, often by providing only a single nonce to each Signing Device 516. In another embodiment the uniqueness of the keys cannot be guaranteed, as some Signing Devices 516 may or may not share signing keys. In that case Bookkeeping Device 518 will treat all Signing Devices 516 as though they may share a key and assign unique blocks to each Signing Device 516.

In addition to assigning work, Bookkeeping Device 518 is responsible for picking which Signing Devices 516 block to use when multiple blocks that pass the fitness function are presented to Bookkeeping Device 518. Any number of algorithms could be used in this case. In one case it could be to pick the fittest block. In another case the least used Signing Devices 516 block could be used. In another case a round robin or random selection could be made.

Figure 6:
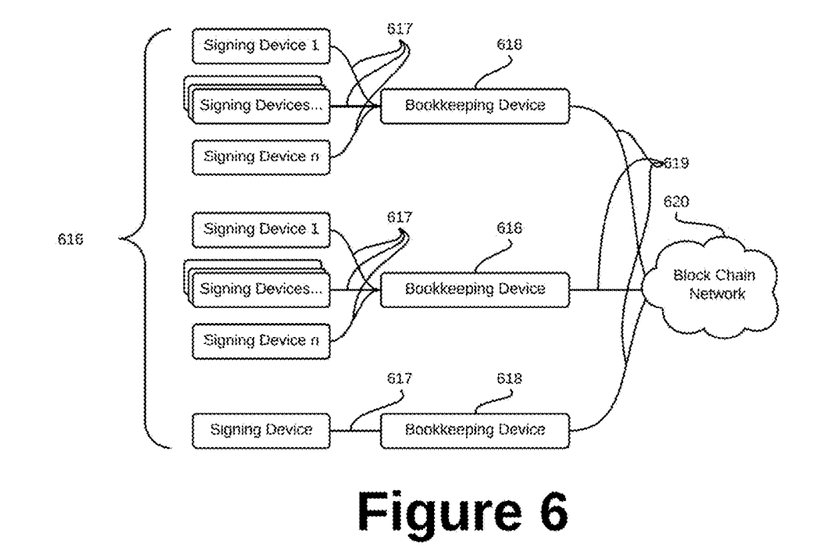
FIG. 6 shows a schematic diagram of multiple bookkeeping devices and various configurations of signing devices servicing a block chain network.

FIG. 6 is a schematic diagram where multiple bookkeeping devices are servicing a block chain network. Referring now to FIG. 6, Block Chain Network 620, Bookkeeping Devices 618, Signing Devices 616, and Communication Channels 617 are the same as shown in FIG. 4 and FIG. 5, except that multiple Bookkeeping Devices 618 access Block Chain Network 620 through Communication Channels 619. The exact configuration between each Bookkeeping Device 618 and their Signing Devices 616 could be either as described in FIG. 4 or FIG. 5.

In this configuration the state of the block chain is maintained in the same fashion as the prior art for block chain networks. The typical algorithm is the use of the longest chain. This diagram shows that the invention disclosed herein can be exposed to a block chain network in a fashion consistent with the prior art's peer-to-peer network.

Figure 7:
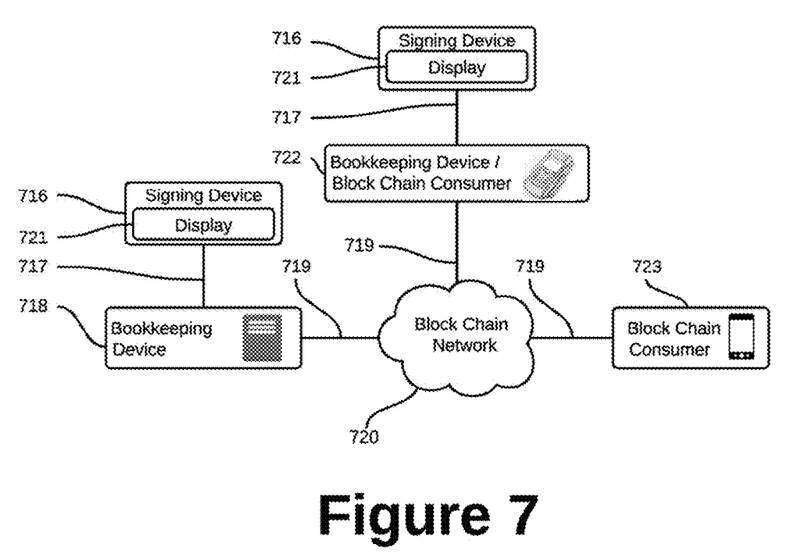
FIG. 7 shows a schematic diagram showing a fully operational block chain network in one embodiment.

FIG. 7 is a schematic diagram showing a fully operational block chain network with the apparatus and methods described in this disclosure. In this case it is a chain restaurant using a block chain network to track customer rewards points. This is one of many possible configurations and uses so it is important to note that the depiction in this figure is not meant to limit the scope of the present invention but to serve as an exemplary concrete illustration.

Referring now to FIG. 7, in the center of the diagram is a Block Chain Network 720 that is connected to various components via a Communication Channels 719 that are the same as shown in FIG. 4, FIG. 5, or FIG. 6. Three devices are of particular interest in FIG. 7: a Bookkeeping Device 718, which in this case is kept in the corporate headquarters of the restaurant, a Bookkeeping Device/Block Chain Consumer 722 which also serves as the point-of-sale system for the restaurant, and Block Chain Consumer 723, which is a mobile phone application installed on a restaurant customer's phone. Multiple other devices may be connected to Block Chain Network 720 and they may be duplicating the roles shown here.

Both the Bookkeeping Device 718 and Bookkeeping Device/Block Chain Consumer Device 722 are connected to one or more Signing Devices 716 via a Communication Channel 717 (that is the same device depicted in FIG. 4, FIG. 5, or FIG. 6). Attached to each of these Signing Devices 716 is a Display 721 that displays current statistics about the blocks being processed such as the rate at which signatures are being generated, how many blocks are in the network, how many other active signing devices are detected, and so on. Display 721 also would communicate other relevant information such as the public key used by that particular signing device.

In this scenario a restaurant customer would earn or redeem rewards points at the Bookkeeping Device/Block Chain Consumer 722 point-of-sale terminal either by interacting with the employee running the point of sale in a normal sale, or through detection in the block chain network a sale initiated by their Block Chain Consumer 723 mobile phone application. Both the Bookkeeping Device 718 in the corporate headquarters and Bookkeeping Device/Block Chain Consumer 722 point-of-sale terminal would produce new blocks reflecting the earning and spending of the rewards points. When not at a restaurant the customer could check out their rewards points totals and purchase history on their Block Chain Consumer 723 mobile phone application.

In the prior art systems and methods, there would be no Signing Device 716, and the blocks in the block chain would not be created according to the methods of that device. This opens up at least two avenues of fraud that the present disclosure helps prevent. First, the restaurant customer can acquire greater quantities of the same equipment that the restaurant uses to maintain their block chain and attaches that to the block chain network in the same fashion that the mobile phone application would be attached. With this higher hashing power, the customer can then prevent certain transactions from being recorded in the block chain, such as rewards points redemptions. The customer will keep getting their free meal without permanently recording their rewards points deduction. In the present disclosure the blocks on the block chain require a digital signature with a private key known only to the signing device integrated into the proof of work. So, while a customer may be able to acquire identical hardware they will not be able to create properly signed blocks. Because of the present disclosure an outsider cannot re-write the block chain, which the prior art systems and methods cannot prevent.

Another form of fraud the present disclosure would prevent would be on the restaurant operators side. If a customer had a very large point total they could presumably buy everyone a free meal one day. Not wanting that to happen the restaurant operator could, under the prior art systems and methods, temporarily acquire excessive amounts of hashing power used to create blocks on their block chain and re-write the rewards points program history for the past year and create a large number of point redemptions for the customer they are concerned about. With the present disclosure the change in the amount of hashing power would either be impossible either because only a fixed set of keys can produce blocks or the large increase in signing keys would become evident in the block chain history. In the teachings of the prior art such insider fraud could not be prevented if the insider was willing to acquire sufficient mining hardware. In the present disclosure, depending on the specific configuration, such fraud would either be impossible because the block chain was configured so new keys could not be added, or would be tamper evident when more signing devices with unique keys are introduced. Hence, it is possible to create a block chain network configuration that is maintained in the same fashion as the prior art for block chain networks. However, with this disclosure the number of Bookkeeping Devices 718 and Bookkeeping Device/Block Chain Consumer 721 devices on the block chain network can be limited and enumerated, whereas before, they could not be limited. In the prior art, any number of devices capable of creating new blocks could be introduced and removed from the block chain network with no means to restrict their movements.

It is also now possible to create a block chain network where the miners serve as disinterested third parties to the payload that is contained in the block chain network. In order to maintain a high hash rate, the prior art found it necessary to require the miners to understand the payload content and to participate in the content of the payload. Some systems use a "proof of state" mechanism that required the miner to have control over some of the tokens of the system described by the payload. Others required the creation of a special "coinbase" transaction where the miner paid itself with newly generated tokens in the system described by the payload. In the present approach the number of mining devices can be held constant and fully enumerated. Hence the block chain generation system described can provide the same or greater level of assurance to the consumers of the block chain that the block chain will be kept secure. The use of public/private key pairs can also be kept separate from the payload of the block chain. Because of that, the miners do not need to participate or even understand the content of the payload. Thus, the content of the data transmitted by the consumers holds no interest to the miners other than the hashing and storage needed as part of the process described in this disclosure.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood by those skilled in the art that many changes in construction and circuitry and widely differing embodiments and applications will suggest themselves without departing from the scope of the disclosed subject matter.

What is claimed is:

1. A method for mining blocks in a block chain, the method comprising the steps of:
   (a) finding by a bookkeeping device a previous block in the block chain;
   (b) calculating by the bookkeeping device a payload for a new block in the block chain;
   (c) updating by the bookkeeping device a plurality of bookkeeping fields that are stored in the new block;
   (d) updating by the bookkeeping device a nonce value;
   (e) receiving from a signing device in the bookkeeping device a digital signature for the new block as a new bookkeeping field;
   (f) hashing by the bookkeeping device the new block;
   (g) comparing the hash of the new block to a bookkeeping rules encoded in one of the plurality of bookkeeping fields in the new block;
   (h) applying a fitness function to the hash of the new block to determine the suitability of adding the new block to the block chain;
   (i) when the hash of the new block passes the fitness function, broadcasting by the bookkeeping device the new block to a block chain network; and
   (j) when the hash of the new block does not pass the fitness function in step (h), repeating by the bookkeeping device one or more of the steps (a) through (g) until the hash of the new block passes the fitness function in step (h).

2. The method for mining blocks in a block chain according to claim 1 further comprising the step of:
   repeating by the bookkeeping device steps (a) through (j) for a plurality of blocks.

3. The method for mining blocks in a block chain according to claim 2 further comprising the steps of:
   broadcasting by the bookkeeping device the plurality of blocks on the block chain network, wherein all of the plurality of blocks broadcast on the block chain network contain the digital signature from the signing device.

4. The method for mining blocks in a block chain according to claim 2 further comprising the step of:
   adding a preselected plurality of additional signing devices to the block chain network, wherein each of the preselected plurality of additional signing devices also provide the digital signatures.

* * * * *